(12) United States Patent
Shao et al.

(10) Patent No.: US 8,373,977 B2
(45) Date of Patent: Feb. 12, 2013

(54) MOVABLE TOUCH MODULE AND ELECTRONIC DEVICE USING THE SAME

(75) Inventors: Jun-Hua Shao, Shanghai (CN); Kuo Hou, Shanghai (CN); Wei Guo, Shanghai (CN); Shih-Wei Hung, Taipei (TW); Cheng-Jun Liu, Shanghai (CN)

(73) Assignees: Protek (Shanghai) Limited, Shanghai (CN); Pegatron Corporation, Taipei (TW)

( * ) Notice: Subject to any disclaimer, the term of this patent is extended or adjusted under 35 U.S.C. 154(b) by 121 days.

(21) Appl. No.: 13/084,237

(22) Filed: Apr. 11, 2011

(65) Prior Publication Data
US 2011/0255242 A1 Oct. 20, 2011

(30) Foreign Application Priority Data
Apr. 15, 2010 (CN) .......................... 2010 1 0148217

(51) Int. Cl.
*G06F 1/16* (2006.01)
(52) U.S. Cl. ........... 361/679.1; 361/679.18; 361/679.26; 361/679.27; 345/158; 345/173; 345/174
(58) Field of Classification Search ............... 361/679.1, 361/679.18
See application file for complete search history.

(56) References Cited

U.S. PATENT DOCUMENTS

| | | | |
|---|---|---|---|
| 5,621,196 A | 4/1997 | Nishijima et al. | |
| 8,213,166 B2 * | 7/2012 | Mihara et al. | 361/679.1 |
| 2006/0238514 A1 * | 10/2006 | Rosenberg et al. | 345/173 |

FOREIGN PATENT DOCUMENTS

| | | |
|---|---|---|
| CN | 1945507 A | 4/2007 |
| CN | 101359264 A | 2/2009 |
| CN | 201247424 Y | 5/2009 |
| JP | 1998-198507 | 1/2000 |
| JP | 1999-338628 | 6/2001 |
| JP | 2003-348370 | 12/2003 |
| JP | 2009-004140 | 1/2009 |
| TW | 200905532 A | 2/2009 |
| TW | M361058 | 7/2009 |

* cited by examiner

*Primary Examiner* — Anthony Q Edwards
(74) *Attorney, Agent, or Firm* — Muncy, Geissler, Olds & Lowe, PLLC

(57) ABSTRACT

A movable touch module and an electronic device using the same are provided. The movable touch module is disposed at a main body. The movable touch module includes a movable element, a touch unit, a plurality of elastic elements, at least four movement sensing elements, and at least two rotation sensing elements. The movable element is disposed at the main body and is movable relative to the main body on a plane. The touch unit is fastened to movable element. The elastic elements are fastened to the main body and are against the periphery of the movable element. The movement sensing elements are fastened to the main body and are located around the movable element. The rotation sensing elements are fastened to the main body.

15 Claims, 6 Drawing Sheets

MOVABLE TOUCH MODULE AND ELECTRONIC DEVICE USING THE SAME

CROSS REFERENCE TO RELATED APPLICATIONS

This Non-provisional application claims priority under 35 U.S.C. §119(a) on Patent Application No(s). 201010148217.9 filed in People's Republic of China on Apr. 15, 2010, the entire contents of which are hereby incorporated by reference.

BACKGROUND OF THE INVENTION

1. Field of Invention

This invention relates to an input device and, more particularly, to a movable touch module and an electronic device using the same.

2. Related Art

With development of science, electronic devices, such as a notebook computer, a mobile communication device, and a media player, have been necessary equipment in people's daily life. In addition, with gradual development of a market, besides functionality of the electronic devices, designs and shapes of the devices are main factors affecting purchase of consumers.

A notebook computer is taken for example. At present, the notebook computer usually has a touchpad to replace a mouse. However, the present touchpad is usually fastened to a main body of the notebook computer, which fails to provide a novel design to show individual styles and also fails to provide intuitive operation such as moving or rotating for users. In addition, when a screen of a notebook computer is not large enough, the users usually need to move a web page upward, downward, leftward, or rightward for complete browse. However, the present touchpad fails to conveniently achieve the above operation.

SUMMARY OF THE INVENTION

This invention is to provide a movable touch module and an electronic device using the same to improve the prior art.

This invention provides a movable touch module disposed at a main body. The movable touch module includes a movable element, a touch unit, a plurality of elastic elements, at least four movement sensing elements, and at least two rotation sensing elements. The movable element is disposed at the main body and is movable relative to the main body on a plane. The touch unit is fastened to the movable element. The elastic elements are fastened to the main body and are against the periphery of the movable element. The movement sensing elements are fastened to the main body and are located around the movable element. The rotation sensing elements are fastened to the main body. When the movable element moves along the plane, the movable element correspondingly triggers one of the movement sensing elements. When the movable element rotates on the plane, the movable element correspondingly triggers one of the rotation sensing elements.

This invention further provides an electronic device including a main body and a movable touch module. The movable touch module is disposed at the main body. The movable touch module includes a movable element, a touch unit, a plurality of elastic elements, at least four movement sensing elements, and at least two rotation sensing elements. The movable element is disposed at the main body and is movable relative to the main body on a plane. The touch unit is fastened to the movable element. The elastic elements are fastened to the main body and are against the periphery of the movable element. The movement sensing elements are fastened to the main body and are located around the movable element. The rotation sensing elements are fastened to the main body. When the movable element moves along the plane, the movable element correspondingly triggers one of the movement sensing elements. When the movable element rotates on the plane, the movable element correspondingly triggers one of the rotation sensing elements.

In the invention, the movable element of the movable touch module is movable relative to the main body on the plane. Further, the touch unit is fastened to the movable element. Thereby, a user can operate the touch unit to allow the movable element to move along the plane or rotate on the plane further to trigger different movement sensing elements or rotation sensing elements, thus to achieve different functions. Thus, the movable touch module and the electronic device using the same in the invention provide a novel design and a convenient and efficient operating mode.

These and other features, aspects, and advantages of the present invention will become better understood with regard to the following description, appended claims, and accompanying drawings.

DETAILED DESCRIPTION OF THE INVENTION

Figure 1:
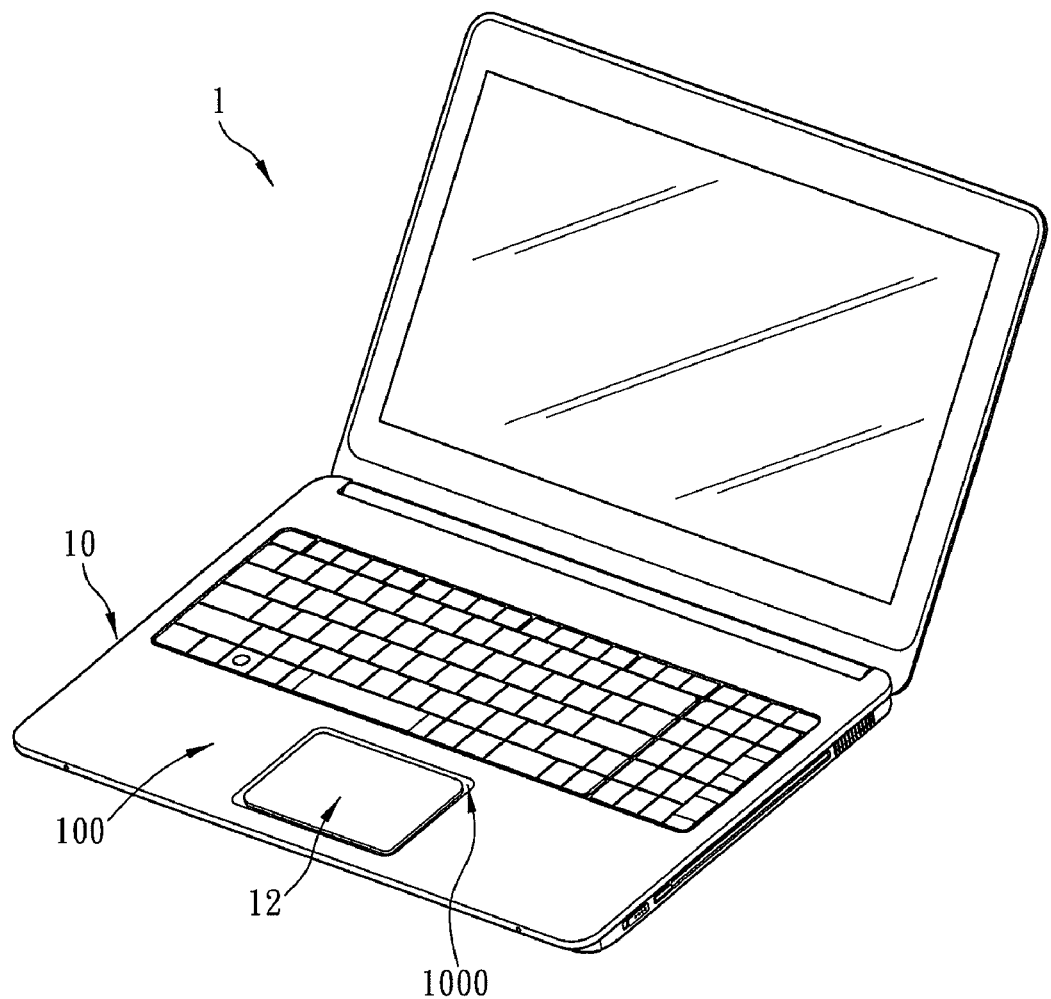
FIG. 1 is a schematic diagram showing an electronic device according to one preferred embodiment of the invention.
Figure 2:
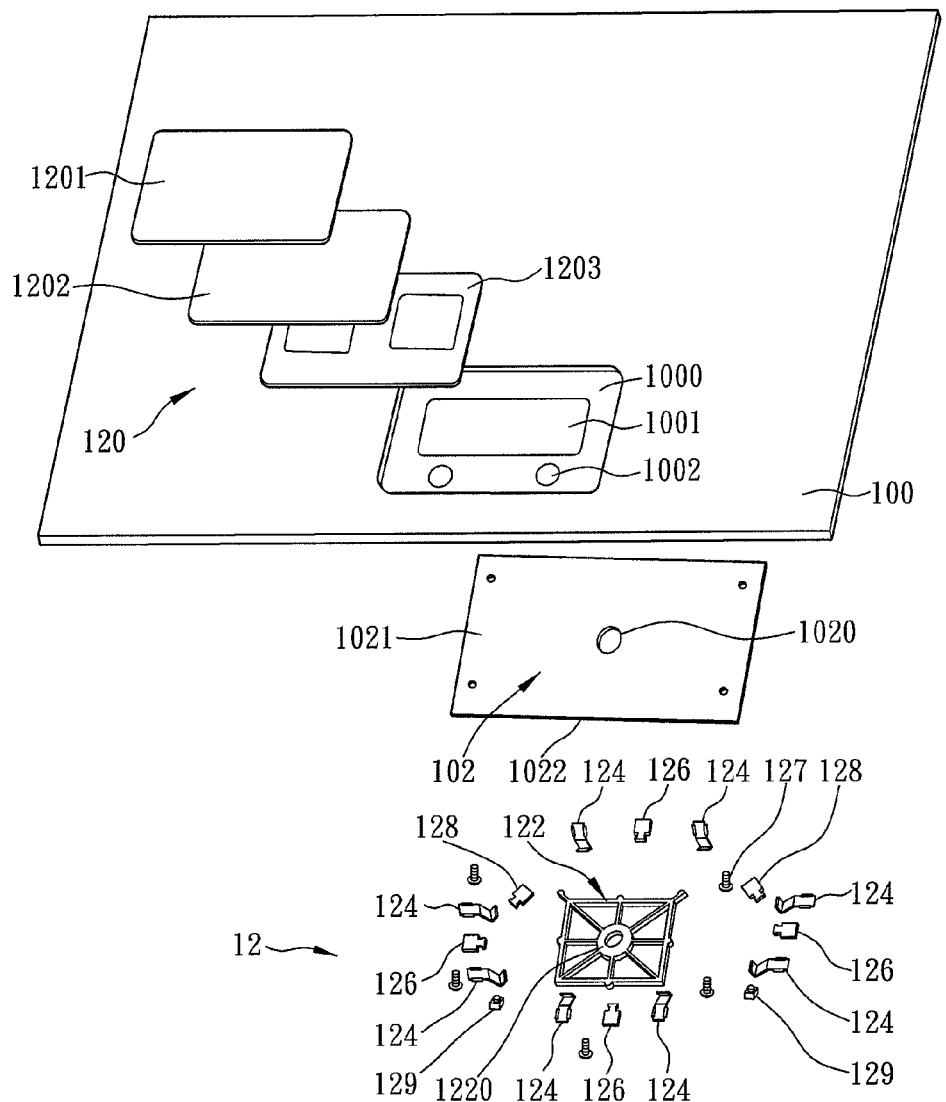
FIG. 2 is a partial exploded diagram showing an electronic device according to one preferred embodiment of the invention.

FIG. 1 is a schematic diagram showing an electronic device according to one preferred embodiment of the invention. FIG. 2 is a partial exploded diagram showing an electronic device according to one preferred embodiment of the invention. In FIG. 1 and FIG. 2, in the embodiment, an electronic device 1 includes a main body 10 and a movable touch module 12.

In the embodiment, the electronic device 1 is a notebook computer. However, the invention is not limited thereto. In other embodiments, the electronic device 1 may be other electronic devices such as a mobile communication device or a media player.

In the embodiment, the movable touch module 12 is disposed at the main body 10. The main body 10 includes a casing 100 and a circuit board 102. The movable touch module 12 includes a touch unit 120, a movable element 122, a plurality of elastic elements 124, a plurality of movement sensing elements 126, a plurality of rotation sensing elements 128, and two pressing switches 129.

In the embodiment, the movable element 122 is disposed at the main body 10 and is movable relative to the main body 10 on a plane. The touch unit 120 is fastened to the movable element 122. The elastic elements 124, the movement sensing elements 126, the rotation sensing elements 128, and the two pressing switches 129 are fastened to the circuit board 102 of the main body 10.

In the embodiment, the casing 100 of the main body 10 is a casing of a notebook computer. The touch unit 120 is disposed at the casing 100. In detail, in FIG. 2, the casing 100 has a recessed containing area 1000. A first opening 1001 and two second openings 1002 are disposed at the containing area 1000. The containing area 1000 is used for containing the touch unit 120. A back surface of the touch unit 120 can be exposed to the first opening 1001 to be fastened to the movable element 122. The two pressing switches 129 fastened to the circuit board 102 are protrudent from the two second openings 1002, respectively. However, the invention is not limited thereto. In other embodiments, only one opening may be disposed at the containing area 1000. In addition, in the embodiment, the first opening 1001 is rectangular, and the second openings 1002 are circular. However, the invention does not limit the shapes of the first opening 1001 and the second openings 1002.

In the embodiment, a size of the touch unit 120 is smaller than that of the containing area 1000. In FIG. 1, there is a certain distance between the touch unit 120 and side walls of the containing area 1000. Further, a bottom surface of the containing area 1000 can be parallel to a plane where the movable element 122 is movable relative to the main body 10. Thereby, in the embodiment, the touch unit 120 can move upward, downward, leftward, rightward, or rotate in the containing area 1000, i.e., along the bottom surface of the containing area 1000. However, the invention is not limited thereto. In other embodiments, the casing 100 may not have the containing area 1000, and the touch unit 120 may be directly disposed on the casing 100. Otherwise, the bottom surface of the containing area 1000 may not be parallel to the plane where the movable element 122 is movable relative to the main body 10. At that moment, the upward, downward, leftward, rightward movement or rotation of the touch unit 120 may not be performed along the bottom surface of the containing area 1000.

In the embodiment, the circuit board 102 is screwed to the casing 100 via a plurality of screws 127 and is located between the containing area 1000 and the movable element 122. In FIG. 2, the circuit board 102 has a first surface 1021 and a second surface 1022 opposite to each other. The elastic elements 124, the movement sensing elements 126, and the rotation sensing elements 128 may be fastened to the second surface 1022 of the circuit board 102 via surface mount technology (SMT). In addition, the two pressing switches 129 may be fastened to the first surface 1021 of the circuit board 102 via SMT and are protrudent from the two second openings 1002 of the casing 100, respectively.

In the embodiment, the movable element 122 is disposed at the second surface 1022 of the circuit board 102. That is, the movable element 122 is located below the circuit board 102. The second surface 1022 of the circuit board 102 can be parallel to the plane where the movable element 122 is movable relative to the main body 10. Thereby, the movable element 122 is movable relative to the main body 10 on the second surface 1022 of the circuit board 102, and the second surface 1022 of the circuit board 102 is parallel to the bottom surface of the containing area 1000 of the casing 100. In other words, in the embodiment, when the touch unit 120 moves or rotates along the bottom surface of the containing area 1000, the movable element 122 can move along the second surface 1022 of the circuit board 102 or rotate on the second surface 1022. In addition, the direction of disposing the touch unit 120, the casing 100, the circuit board 102, and the movable element 122 is vertical to the second surface 1022 of the circuit board 102.

Figure 3:
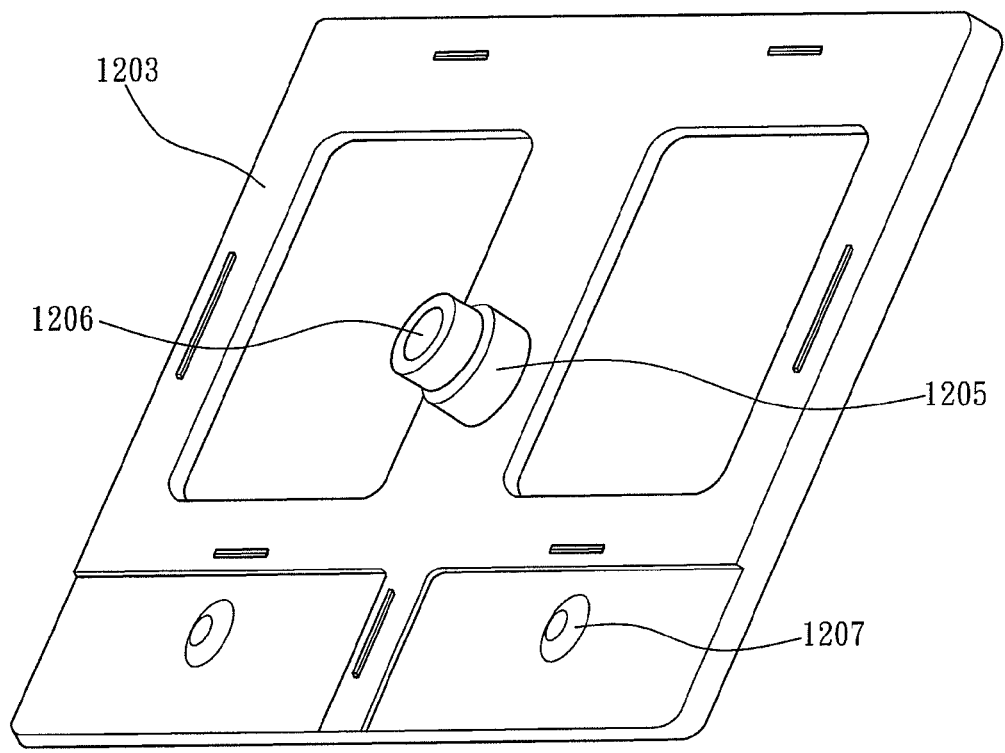
FIG. 3 is a partial schematic diagram showing a touch unit in FIG. 2.
Figure 4:
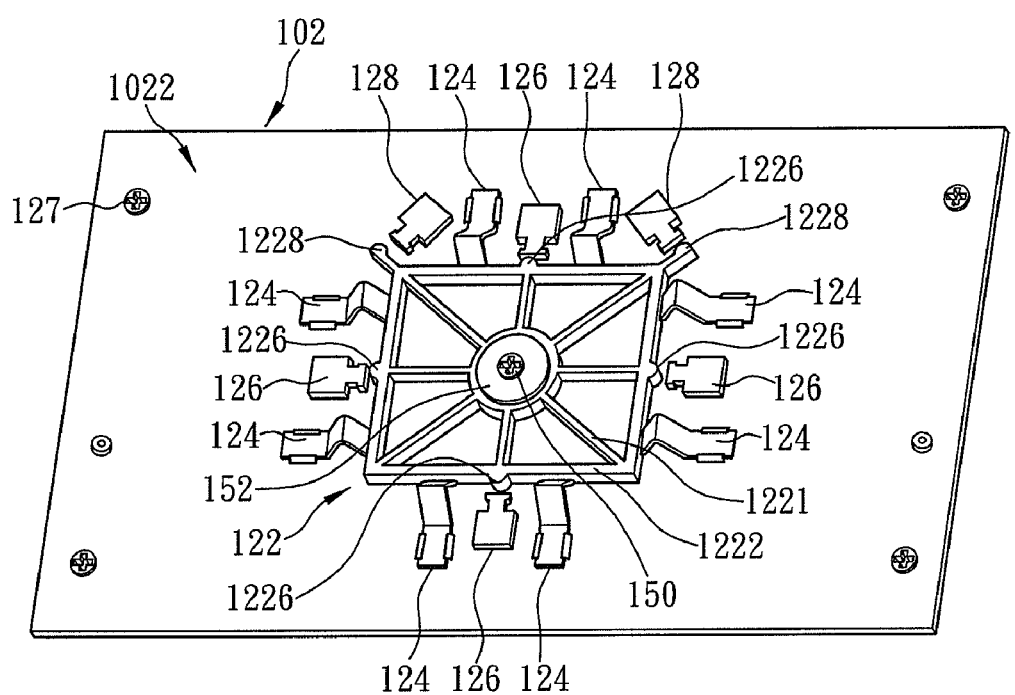
FIG. 4 is a partial schematic diagram showing a movable touch module in FIG. 2.

FIG. 3 is a partial schematic diagram showing the touch unit 120 in FIG. 2. FIG. 4 is a partial schematic diagram showing the movable touch module 12 in FIG. 2. Please refer to FIG. 2 to FIG. 4.

In the embodiment, in FIG. 2, the touch unit 120 includes a touch film 1201, a touch pad 1202, and a bracket 1203. The touch film 1201 is fastened to the touch pad 1202; the touch pad 1202 is fastened to bracket 1203; the bracket 1203 is disposed in the containing area 1000 of the casing 100. The touch unit 120 is rectangular. However, the invention is not limited thereto. In a practical application, the touch unit with different shapes can be set according to needs. In addition, the touch pad 1202 of the touch unit 120 can be connected with a motherboard or a circuit board of the electronic device via a flexible flat cable (FFC) to achieve functions of a conventional touchpad. For example, the touch pad 1202 may sense movement of fingers of a user on the touch film 1201 to control movement of a cursor on a screen.

In the embodiment, the touch unit 120 is fastened to the movable element 122 via the bracket 1203. In FIG. 3, a surface of the bracket 1203 where the movable element 122 is fastened to is shown. The bracket 1203 has a protrudent portion 1205. In addition, in FIG. 2, the movable element 122 has a hole 1220. The protrudent portion 1205 of the bracket 1203 can pass through the first opening 1001 of the casing 100, a hole 1020 of the circuit board 102, and the hole 1220 of the movable element 122 in order. In the embodiment, the protrudent portion 1205 of the bracket 1203 has a screw hole 1206. After the protrudent portion 1205 of the bracket 1203 passes through the first opening 1001 of the casing 100, the hole 1020 of the circuit board 102, and the hole 1220 of the movable element 122, a screw 150 can be against a spacer 152 to be screwed to the screw hole 1206 of the protrudent portion 1205, as shown in FIG. 4. Thereby, the bracket 1203 can be fastened to the movable element 122. However, the invention is not limited thereto. In other embodiments, the bracket 1203 may be fastened to the movable element 122 via the tight fitting between the protrudent portion 1205 of the bracket 1203 and the hole 1220 of the movable element 122.

In addition, in the embodiment, the touch unit 120 covers the pressing switches 129. In FIG. 3, the bracket 1203 has two recessed portions 1207. The recessed portions 1207 correspond to the second openings 1002 of the casing 100, respectively, for containing the pressing switches 129 protrudent from the second openings 1002. Thereby, the user can press a corresponding position on the touch film 1201 of the touch unit 120 to trigger the corresponding pressing switch 129. In the embodiment, the two pressing switches 129 are equivalent to left and right buttons around a touch area of a conventional notebook computer. In other words, the movable touch module 12 in the embodiment has a left and right button function.

In the embodiment, in FIG. 4, the second surface 1022 of the circuit board 102 is shown. In the embodiment, the movable element 122 has a main body portion 1221, four movement triggering portions 1226, and two rotation triggering portions 1228. The main body portion 1221 is a hollow rectangle with four side walls 1222. However, the invention does not limit the shape of the main body portion 1221 of the movable element 122. In other embodiments, the main body portion 1221 may be circular or elliptical.

In addition, in the embodiment, the four movement triggering portions 1226 are correspondingly disposed at outer sides of the four side walls 1222, respectively. The two rotation triggering portions 1228 are correspondingly disposed at outer sides of connecting places of the side walls 1222, respectively. In detail, each of the movement triggering portions 1226 is a protrudent point at the outer side of a center position of the respective side wall 1222. The rotation triggering portion 1228 is located at an extension line of a diagonal line of the main body portion 1221, and the two rotation triggering portions 1228 are located at an upper side of the main body portion 1221 and are opposite to each other. However, the invention is not limited thereto. In other embodiments, two movement triggering portions 1226 may be disposed at each of the side walls 122 (i.e., eight movement triggering portions 1226 are totally disposed), or four rotation triggering portions 1228 may also be disposed. In addition, the invention does not limit the positions of the movement triggering portions 1226 and the rotation triggering portions 1228.

In the embodiment, in FIG. 4, the elastic elements 124 are against the periphery of the movable element 122 for restoring the movable element 122. The number of the elastic elements 124 is eight. In detail, every two elastic elements 124 are against one side wall 1222 of the main body portion 1221 of the movable element 122. However, the invention is not limited thereto. In a practical application, the number of the elastic elements 124 may be set according to needs. In addition, in the embodiment, the elastic elements 124 are elastic sheets. However, the invention is not limited thereto. The elastic elements 124 may be other elastic structures such as springs.

In the embodiment, the number of the movement sensing elements 126 is four, and the movement sensing elements 126 are located around the movable element 122. In FIG. 4, the four movement sensing elements 126 are located at one side of the four movement triggering portions 1226 of the movable element 122, respectively. However, the invention does not limit the number of the movement sensing elements 126.

In the embodiment, in FIG. 4, the number of the rotation sensing elements 128 is two, and the rotation sensing elements 128 are located at one side of the rotation triggering portions 1228 of the movable element 122, respectively. However, the invention does not limit the number of the rotation sensing elements 1228.

In addition, the invention does not limit the positions of the movement sensing elements 126 and the rotation sensing elements 128, as long as they are located at a moving or rotating path of the movable element 122.

In the embodiment, the movement sensing elements 126 and the rotation sensing elements 128 are preferably two-stage switches. However, the invention is not limited thereto. In a practical application, the type of the switch can be set according to needs.

In the embodiment, in FIG. 4, the movable element 122 is located at an initial position (that is, the touch unit 120 does not move). At that moment, the movable element 122 does not trigger any movement sensing elements 126 or rotation sensing elements 128, and the elastic elements 124 are in an initial state. Detailed operation of the movable touch module 12 is described hereinbelow.

Figure 5A:
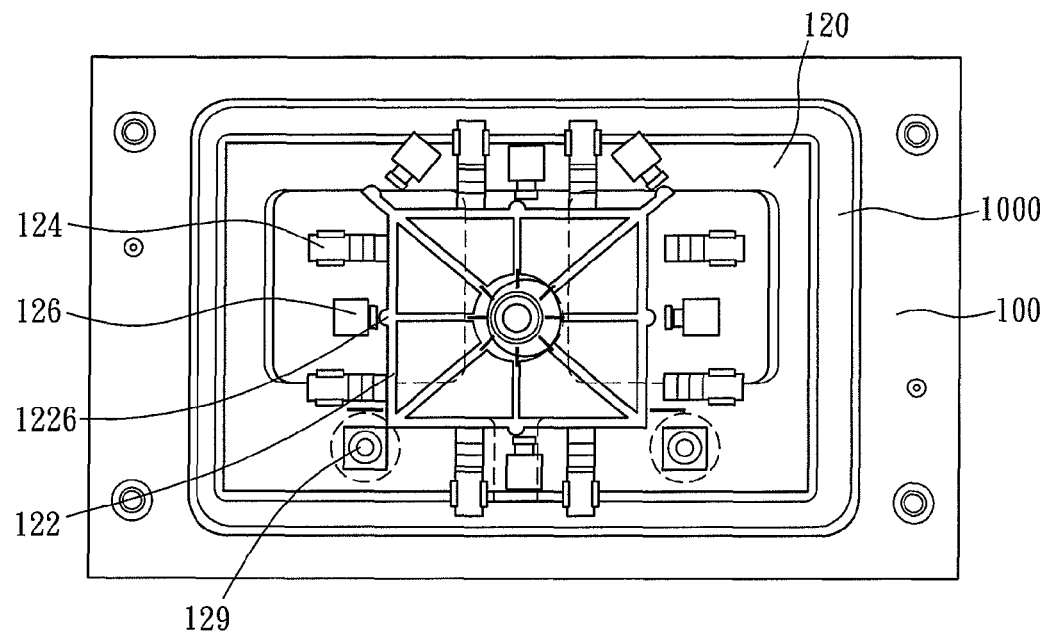
FIG. 5A to FIG. 5C are schematic diagrams showing operation of a movable touch module according to one preferred embodiment of the invention.
Figure 5B:
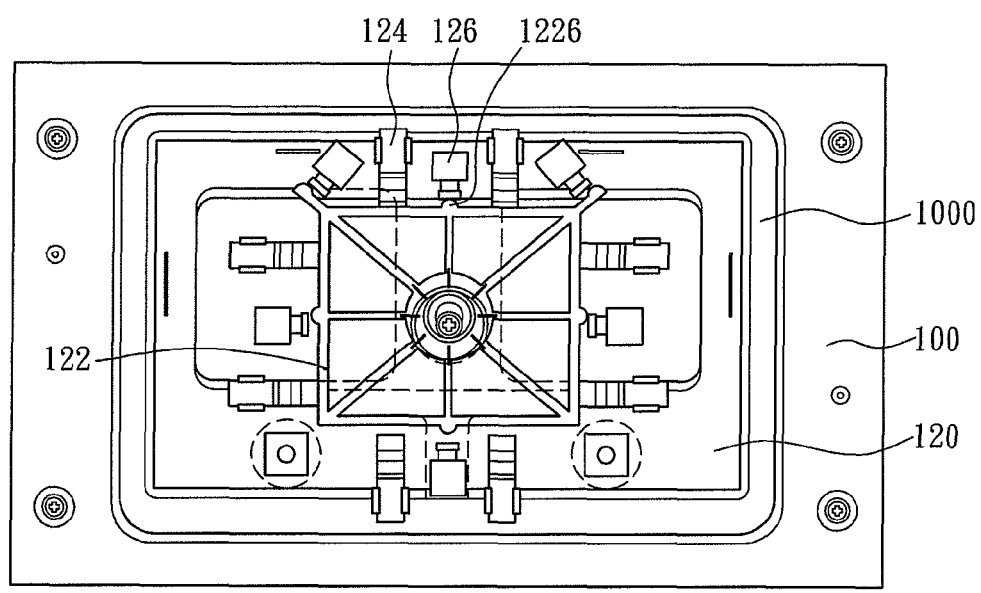
Figure 5C:
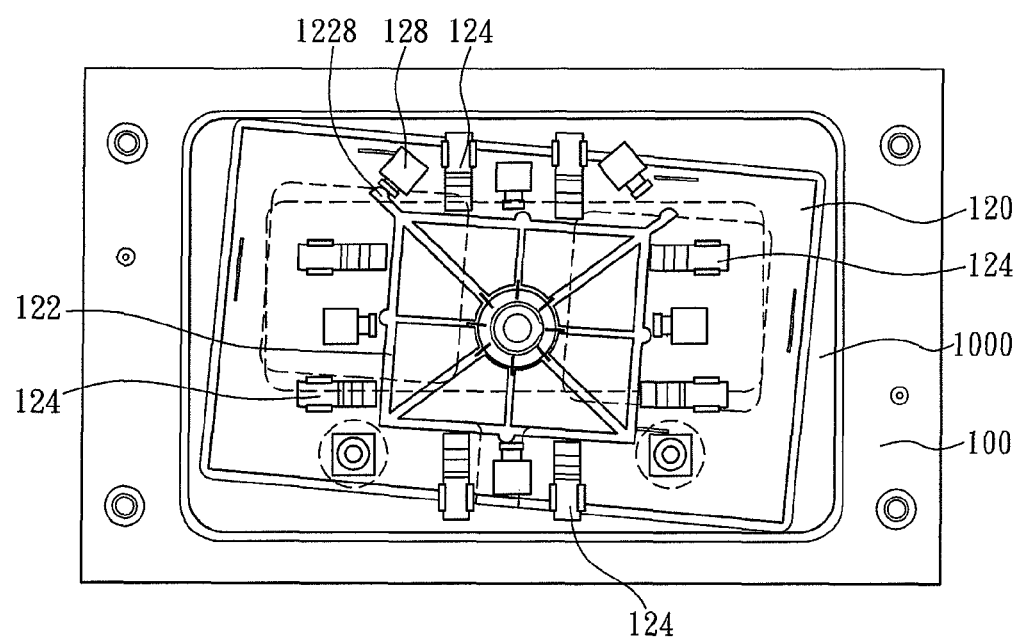

FIG. 5A to FIG. 5C are schematic diagrams showing operation of the movable touch module according to one preferred embodiment of the invention. Please refer to FIG. 2, FIG. 4, FIG. 5A, FIG. 5B, and FIG. 5C.

In the embodiment, when a user operates the touch unit 120 to move upward, downward, leftward, or rightward along the bottom surface of the containing area 1000 of the casing 100 or to rotate thereon, since the touch unit 120 is fastened to the movable element 122, the movable element 122 can also move upward, downward, leftward, or rightward along a plane or rotate on the plane. In the embodiment, the plane is the second surface 1022 of the circuit board 102.

In detail, in FIG. 5A, when the user operates the touch unit 120 to move leftward along the bottom surface of the containing area 1000, the movable element 122 can move leftward along the second surface 1022 of the circuit board 102, and the left movement triggering portion 1226 of the movable element 122 can contact and trigger the corresponding movement sensing element 126 on the circuit board 102, further to control the electronic device to perform a corresponding operation (such as moving a picture leftward or turning a web page forward). At that moment, the movable element 122 pushes the elastic elements 124 at a left side of the movable element 122, and the elastic elements 124 are compressed to generate elastic force. Afterwards, when the user releases the touch unit 120, the elastic elements 124 at the left side can push the movable element 122 back to the initial position via the elastic force, and the elastic elements 124 can be restored to the initial state. In addition, in the embodiment, the movement sensing element 126 is a two-stage switch. Therefore, after the movement sensing element 126 is triggered, the movement sensing element 126 can be restored by itself.

For example, in a practical application, when a screen of a notebook computer is not large enough, the user may operate the touch unit 120 to move leftward to control a current web page to correspondingly move leftward. When the user releases the touch unit 120, the web page may stop moving, and a corresponding portion of the web page may be shown on the screen. Thus, the user can conveniently browse the web page just by moving the touch unit 120 along different directions.

In addition, in the embodiment, when the user operates the touch unit 120 to move rightward along the plane where the containing area 1000 is disposed, the movable element 122 can move rightward along the second surface 1022 of the circuit board 102, and the right movement triggering portion 1226 of the movable element 122 can contact and trigger the corresponding movement sensing element 126 on the circuit board 102, further to control the electronic device to perform a corresponding operation (such as moving a picture rightward or turning a web page backward).

In the embodiment, in FIG. 5B, when the user operates the touch unit 120 to move upward along the plane where the containing area 1000 is disposed, the movable element 122 can move upward along the second surface 1022 of the circuit board 102, and the upper movement triggering portion 1226 of the movable element 122 can contact and trigger the corresponding movement sensing element 126 on the circuit board 102, further to control the electronic device to perform a corresponding operation (such as, moving a picture upward or turning up volume). At that moment, the movable element 122 pushes the elastic elements 124 at an upper side of the movable element 122, and the elastic elements 124 are compressed to generate elastic force. Afterwards, when the user releases the touch unit 120, the upper elastic elements 124 pushes the movable element 122 back to the initial position via the elastic force thereof, and the elastic elements 124 are restored to the initial state.

In addition, in the embodiment, when the user operates the touch unit 120 to move downward along the plane where the containing area 1000 is disposed, the movable element 122 can move downward along the second surface 1022 of the circuit board 102, and the lower movement triggering portion 1226 of the movable element 122 can contact and trigger the corresponding movement sensing element 126 on the circuit board 102, further to control the electronic device to perform a corresponding operation (such as, moving a picture downward or turning down volume).

In the embodiment, in FIG. 5C, when the user operates the touch unit 120 to rotate clockwise on the plane where the containing area 1000 is disposed, the movable element 122 can rotate clockwise on the second surface 1022 of the circuit board 102, and the top-left rotation triggering portion 1228 of the movable element 122 can contact and trigger the corresponding rotation sensing element 128 on the circuit board 102, further to control the electronic device to perform a corresponding operation (such as rotating a picture clockwise or starting a certain program). At that moment, the movable element 122 may push the surrounding elastic elements 124 by rotation, and the elastic elements 124 are compressed to generate elastic force. Afterwards, when the user releases the touch unit 120, the surrounding elastic elements 124 push the movable element 122 back to the initial position via the elastic force, and the elastic elements 124 are restored to the initial state.

In addition, in the embodiment, when the user operates the touch unit 120 to rotate counter-clockwise on the plane where the containing area 1000 is disposed, the movable element 122 can rotate counter-clockwise on the second surface 1022 of the circuit board 102, and the top-right rotation triggering portion 1228 of the movable element 122 can contact and trigger the corresponding rotation sensing element 128 on the circuit board 102, further to control the electronic device to perform a corresponding operation (such as rotating a picture counter-clockwise or stopping a certain program). In a practical application, the functions to which the upward, downward, leftward, or rightward movement and rotation of the touch unit 120 correspond can be set according to needs. However, the invention is not limited thereto.

In addition, in the embodiment, the movable touch module 12 also has a left and right button function. In FIG. 5A, the user can press the touch unit 120 to trigger the covered pressing switches 129. The touch unit 120 can be restored to the initial position via elasticity of the pressing switches 129.

To sum up, in the embodiment, the movable element of the movable touch module is movable relative to the main body on a plane. Further, the touch unit is fastened to the movable element. Thereby, the user can operate the touch unit to allow the movable element to move along the plane or rotate on the plane to trigger different movement sensing elements or rotation sensing elements, thus to achieve different functions. In addition, in the embodiment, the movable touch module also has the left and right button function. Thus, the movable touch module and the electronic device using the same in the embodiment can provide a novel design and a convenient and efficient operating mode.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A movable touch module disposed at a main body, the movable touch module comprising:
   a movable element disposed at the main body and being movable relative to the main body on a plane;
   a touch unit fastened to the movable element;
   a plurality of elastic elements fastened to the main body and being against the periphery of the movable element;
   at least four movement sensing elements fastened to the main body and located around the movable element; and
   at least two rotation sensing elements fastened to the main body,
   wherein when the movable element moves along the plane, the movable element correspondingly triggers one of the movement sensing elements, and when the movable element rotates on the plane, the movable element correspondingly triggers one of the rotation sensing elements.

2. The movable touch module according to claim 1, wherein the main body comprises a circuit board and a casing, the casing has a containing area, the touch unit is disposed at the containing area, the circuit board is fastened to the casing and is located between the containing area and the movable element, and the elastic elements, the movement sensing elements, and the rotation sensing elements are fastened to the circuit board.

3. The movable touch module according to claim 1, wherein the movable touch module further comprise two pressing switches disposed at the main body, and the touch unit covers the pressing switches.

4. The movable touch module according to claim 1, wherein the elastic elements are elastic sheets.

5. The movable touch module according to claim 1, wherein the touch unit comprises a touch pad and a bracket, the touch pad is fastened to the bracket, and the bracket is disposed at the main body and is fastened to the movable element.

6. The movable touch module according to claim 5, wherein the bracket of the touch unit has a protrudent portion, the movable element has a hole, and the protrudent portion passes through the hole to fasten the touch unit to the movable element.

7. The movable touch module according to claim 1, wherein the movable element has a main body portion, four movement triggering portions, and two rotation triggering portions, the main body portion is a rectangle with four side walls, the movement triggering portions are correspondingly disposed at outer sides of the side walls, respectively, and the rotation triggering portions are correspondingly disposed at outer sides of connecting places of the side walls, respectively.

8. An electronic device comprising:
   a main body; and
   a movable touch module disposed at the main body, the movable touch module including:
      a movable element disposed at the main body and being movable relative to the main body on a plane;
      a touch unit fastened to the movable element;
      a plurality of elastic elements fastened to the main body and being against the periphery of the movable element;
      at least four movement sensing elements fastened to the main body and located around the movable element; and
      at least two rotation sensing elements fastened to the main body,
   wherein when the movable element moves along the plane, the movable element correspondingly triggers one of the movement sensing elements, and when the movable element rotates on the plane, the movable element correspondingly triggers one of the rotation sensing elements.

9. The electronic device according to claim 8, wherein the main body comprises a circuit board and a casing, the casing has a containing area, the touch unit is disposed at the containing area, the circuit board is fastened to the casing and is located between the containing area and the movable element, and the elastic elements, the movement sensing elements, and the rotation sensing elements are fastened to the circuit board.

10. The electronic device according to claim 8, wherein the movable touch module further comprises two pressing switches disposed at the main body, and the touch unit covers the pressing switches.

11. The electronic device according to claim 8, wherein the elastic elements are elastic sheets.

12. The electronic device according to claim 8, wherein the touch unit comprises a touch pad and a bracket, the touch pad is fastened to the bracket, and the bracket is disposed at the main body and is fastened to the movable element.

13. The electronic device according to claim 12, wherein the bracket of the touch unit has a protrudent portion, the movable element has a hole, and the protrudent portion passes through the hole to fasten the touch unit to the movable element.

14. The electronic device according to claim 8, wherein the movable element has a main body portion, four movement triggering portions, and two rotation triggering portions, the main body portion is a rectangle with four side walls, the movement triggering portions are correspondingly disposed at outer sides of the side walls, respectively, and the rotation triggering portions are correspondingly disposed at outer sides of connecting places of the side walls, respectively.

15. The electronic device according to claim 8, wherein the electronic device is a notebook computer.

\* \* \* \* \*